US011223139B2

United States Patent
Onishi et al.

(10) Patent No.: US 11,223,139 B2
(45) Date of Patent: Jan. 11, 2022

(54) EXPANDABLE ANTENNA

(71) Applicant: INSTITUTE FOR Q-SHU PIONEERS OF SPACE, INC., Fukuoka (JP)

(72) Inventors: Shunsuke Onishi, Fukuoka (JP); Tetsuo Yasaka, Fukuoka (JP); Kazuo Kuno, Fukuoka (JP); Yohei Koga, Fukuoka (JP)

(73) Assignee: INSTITUTE FOR Q-SHU PIONEERS OF SPACE, INC., Fukuoka (JP)

( * ) Notice: Subject to any disclaimer, the term of this patent is extended or adjusted under 35 U.S.C. 154(b) by 0 days.

(21) Appl. No.: 16/311,696

(22) PCT Filed: Jun. 19, 2017

(86) PCT No.: PCT/JP2017/022485
§ 371 (c)(1),
(2) Date: Dec. 20, 2018

(87) PCT Pub. No.: WO2017/221872
PCT Pub. Date: Dec. 28, 2017

(65) Prior Publication Data
US 2019/0165481 A1    May 30, 2019

(30) Foreign Application Priority Data
Jun. 21, 2016    (JP) .................................. 2016-123010

(51) Int. Cl.
*H01Q 15/16* (2006.01)
*H01Q 15/20* (2006.01)
(Continued)

(52) U.S. Cl.
CPC ............. *H01Q 15/161* (2013.01); *B64G 1/22* (2013.01); *B64G 1/66* (2013.01); *H01Q 1/08* (2013.01); *H01Q 15/20* (2013.01)

(58) Field of Classification Search
CPC ........ H01Q 15/161; H01Q 1/08; H01Q 15/20; B64G 1/22; B64G 1/66
See application file for complete search history.

(56) References Cited

U.S. PATENT DOCUMENTS

| 1,833,004 A | 11/1931 | Spiro |
| 3,217,328 A | 11/1965 | Miller |

(Continued)

FOREIGN PATENT DOCUMENTS

| DE | 103 18 885 A1 | 11/2004 |
| EP | 1 077 506 A1 | 2/2001 |

(Continued)

OTHER PUBLICATIONS

International Search Report dated Sep. 5, 2017 for PCT/JP2017/022485 filed on Jun. 19, 2017, 9 pages including English translation.
Extended European Search Report dated Feb. 10, 2020 in European Patent Application No. 17815340.9, 10 pages.

(Continued)

*Primary Examiner* — Dimary S Lopez Cruz
*Assistant Examiner* — Noel Maldonado
(74) *Attorney, Agent, or Firm* — Xsensus LLP

(57) ABSTRACT

An expandable antenna includes: a plurality of ribs arranged with a regulated angular pitch at an outer circumferential portion of a hub; and a metal mesh installed between the plurality of adjacent ribs, wherein each of the plurality of ribs is formed in a horizontally elongated thin flat plate shape with elasticity, and a segment to which the metal mesh is attached is formed in a parabolic shape. A flat plane of each of the plurality of ribs is arranged so as to be substantially parallel to a central axis of the hub. The object of the (Continued)

present invention is to provide the expandable antenna which can be easily expanded in outer space with a simple structure and can realize a desired shape after expansion.

4 Claims, 7 Drawing Sheets

(51) Int. Cl.
*B64G 1/22* (2006.01)
*B64G 1/66* (2006.01)
*H01Q 1/08* (2006.01)

(56) References Cited

U.S. PATENT DOCUMENTS

| | | | | |
|---|---|---|---|---|
| 3,541,569 | A | * | 11/1970 | Acker .................. H01Q 15/161 343/915 |
| 3,848,821 | A | | 11/1974 | Scheel |
| 4,030,103 | A | | 6/1977 | Campbell |
| 4,498,087 | A | * | 2/1985 | Imbiel .................. H01Q 15/161 343/915 |
| 4,568,945 | A | * | 2/1986 | Winegard ............ H01Q 15/162 343/916 |
| 5,446,474 | A | | 8/1995 | Wade et al. |
| 5,969,695 | A | | 10/1999 | Bassily et al. |
| 6,214,144 | B1 | | 4/2001 | Bassily et al. |
| 6,384,800 | B1 | | 5/2002 | Bassily et al. |
| 8,356,774 | B1 | | 1/2013 | Banik et al. |
| 2016/0036134 | A1 | * | 2/2016 | Clayton ................. H01Q 1/288 343/781 R |

FOREIGN PATENT DOCUMENTS

| | | |
|---|---|---|
| FR | 2836451 A1 | 8/2003 |
| JP | 58-37209 A | 3/1983 |
| JP | 2-112304 A | 4/1990 |
| JP | H02-99497 A | 4/1990 |
| JP | 2001-36334 A | 2/2001 |
| JP | 2005-086698 A | 3/2005 |
| JP | 2008-187650 A | 8/2008 |
| WO | 91/08949 A | 6/1991 |

OTHER PUBLICATIONS

W.D. Wade et al., "Final Report for Study of Wrap-Rib Antenna Design," Lockheed Missiles & Space Company, Inc. Dec. 12, 1979, 83 pages.

Dr. Yoshiro OGI, "Development of a Novel X-Brand Cassegrain Deployable Antenna for Microsatellite Platforms." Oxford Space Systems. iCubeSat 2018, May 29, 2018, 16 pages.

Robert E. Freeland et al., "Deployable Antenna Structures Technologies," California Institute of Technology, Nov. 10-11, 2008, 58 pages.

Japanese Office Action dated Jun. 1, 2021 in Japanese Application No. 2019-234325.

* cited by examiner

EXPANDABLE ANTENNA

CROSS REFERENCE TO RELATED APPLICATIONS

This application claims priority to Japanese Patent Application No. 2016-123010, filed on Jun. 21, 2016, the entire contents of which are incorporated herein by reference.

TECHNICAL FIELD

The present invention relates to an expandable antenna.

BACKGROUND ART

Conventionally, as represented by portable antennas or satellite-mounted antennas, expandable antennas mounted on spacecrafts such as artificial satellites are compactly accommodated when moving or not in use and are expanded at the time of use and are used for communication. In particular, an antenna in which an antenna mirror surface is formed by combining ribs and meshes is suitable for expansion and is variously applicable.

Such an expandable antenna is broadly classified into a rib/hinge type expandable antenna and a wrap-rib type expandable antenna. A rib/hinge type expandable antenna is an expandable antenna of a type in which a plurality of ribs are sequentially connected via a hinge and which is folded at the time of storage and extended by a spring or the like provided around the hinge at the time of expansion (see Patent Literature 1). On the other hand, the wrap-rib expandable antenna is an expandable antenna of a type which can be stored by elastic deformation of ribs. For example, there are large antennas such as ATS-6 or ETS-8 can be mentioned.

Patent Literature 1 discloses a technique related to an expandable antenna which can be compactly folded at the time of storage and can be easily expanded on a track by constructing a metal mesh for forming an antenna reflector and an expandable mast for supporting a cable network with expandable ribs capable of being bent in two or three steps and expandable hinges connecting between the expandable ribs.

CITATION LIST

Patent Literature

Patent Literature 1: JP 2005-86698 A

SUMMARY OF INVENTION

Technical Problem

Meanwhile, the expandable antenna is used in outer space. Therefore, how to realize the ease of expansion when expanded in outer space and how to realize a desired shape after expansion was a conventional problem.

With respect to such a conventional problem, in the rib/hinge type expandable antenna according to the conventional technique, the number of parts is increased as many as the number of hinges provided therein, resulting in a complicated structure. In the wrap-rib type expandable antenna according to the conventional technique, the rib is attached in a direction perpendicular to an outer peripheral surface of a hub. Therefore, when winding the rib around the hub, a large stress is generated at an attachment portion to the hub, and thus it is necessary to attach the rib through some mechanism.

The present invention has been made in view of the above points, and an object of the present invention is to provide an expandable antenna which can be easily expanded in outer space with a simple structure and can realize a desired shape after expansion.

Solution to Problem

In order to achieve the object described above, an expandable antenna according to the present invention includes: a plurality of ribs arranged with a regulated angular pitch at an outer circumferential portion of a hub; and a metal mesh installed between the plurality of adjacent ribs, wherein each of the plurality of ribs is formed in a horizontally elongated thin flat plate shape with elasticity, and a segment to which the metal mesh is attached is formed in a parabolic shape, and a flat plane of each of the plurality of ribs is arranged so as to be substantially parallel to a central axis of the hub.

Advantageous Effects of Invention

According to the present invention, it is possible to easily expand in outer space with a simple structure and realize a desired shape after expansion.

DESCRIPTION OF EMBODIMENTS

Hereinafter, embodiments of the present invention will be described.

[Overall Configuration Example of Expandable Antenna]

Figure 1:
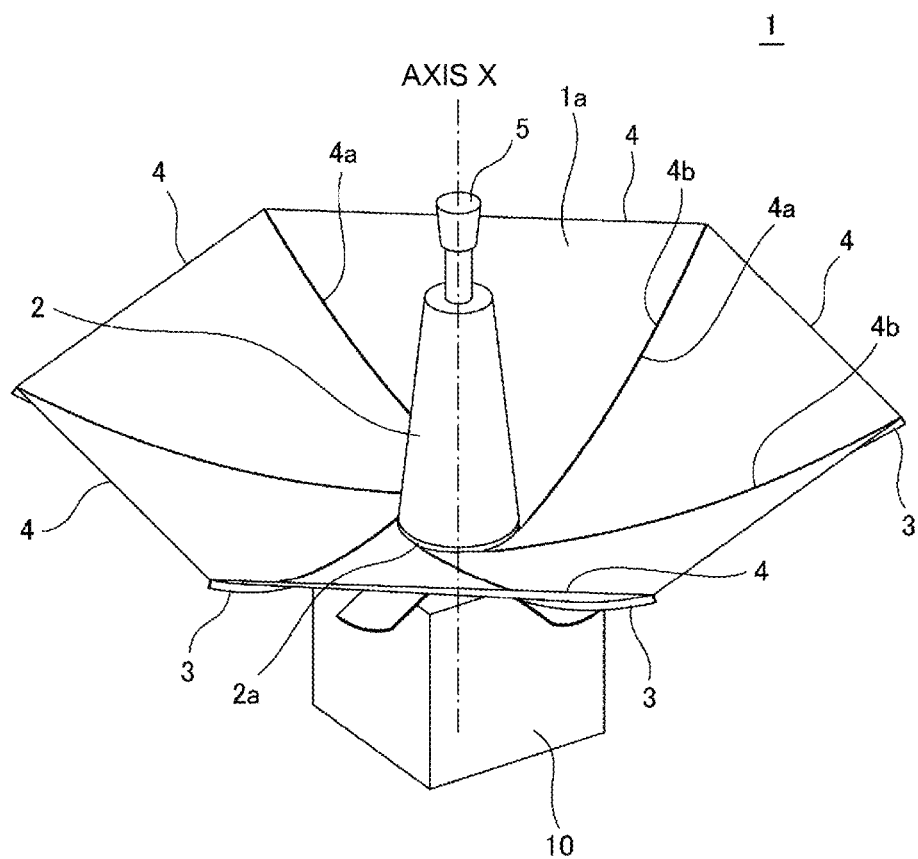
FIG. 1 is a diagram illustrating an overall configuration example of an expandable antenna according to an embodiment of the present invention.

FIG. 1 is a diagram illustrating an overall configuration example of an expandable antenna according to an embodiment of the present invention.

The expandable antenna 1 illustrated in FIG. 1 includes a hub 2, a plurality of ribs 3, a plurality of metal meshes 4, a primary radiator 5, and the like. The expandable antenna 1 is a parabolic antenna which is fixed to a satellite structure 10 through the hub 2.

The hub 2 is provided on an antenna axis X at the central portion of the expandable antenna 1 and is a truncated conical member made of, for example, a dielectric such as plastic. A rib attachment portion 2a, which is made of a metal such as titanium or stainless steel, is provided below the hub 2. The outer periphery of the rib attachment portion 2a forms a circumferential surface (hereinafter also referred to as an "outer circumferential portion 2a", see FIG. 3 or the like), and the plurality of ribs 3 are radially arranged with a regular angular pitch. It should be noted that the antenna axis X can be paraphrased as the central axis of the hub 2.

The ribs 3 are radially arranged around the hub 2 with a regular angular pitch and constitute a reflecting mirror surface 1a of the expandable antenna 1 together with the metal meshes 4 which are disposed between the adjacent ribs 3. It should be noted that a segment of the rib 3 on the reflecting mirror surface 1a side, that is, a segment 3a (see FIG. 2) to which the metal mesh 4 is attached is formed in a parabolic shape. The rib 3 is a elastic material made of a composite material such as stainless spring steel, glass fiber reinforced plastics (GFRP), or carbon fiber reinforced plastics (CFRP). The configuration of the rib 3 will be described in detail with reference to FIG. 2.

The metal mesh 4 is installed between the adjacent ribs 3 and is a reticulated body made of a metal such as molybdenum or gold. Each of end edges 4a and 4b of the metal mesh 4 is attached to the segment 3a on the reflecting mirror surface 1a side of each of the adjacent ribs 3.

The primary radiator 5 is an emitter that emits radio waves, and emits radio waves to the reflecting mirror surface 1a. Radio waves reflected by the reflecting mirror surface 1a are emitted to the outside of the expandable antenna 1. Due to the primary radiator 5 and the reflecting mirror surface 1a, the expandable antenna 1 realizes a function as a parabolic antenna.

As described above, the expandable antenna 1 is a parabolic expandable antenna provided with the plurality of ribs 3 arranged with a regulated angular pitch on the outer circumferential portion 2a of the hub 2 having a truncated conical shape and the metal meshes 4 installed between the adjacent ribs 3. Since the expandable antenna 1 is constituted by the lightweight ribs 3 and the metal meshes 4, the expandable antenna 1 can be easily expanded. An expansion method will be described later.

It should be noted that the metal mesh 4 installed between the adjacent ribs 3 has a parabolic shape at the attachment portion to the rib 3, that is, the end edges 4a and 4b, but does not have a parabolic shape at the other positions. This is for maintaining the tensile force of the metal mesh 4 at a certain level or more when the antenna is expanded. However, it is possible to approximate the parabolic shape as a whole by increasing the number of ribs 3. In addition, it is possible to set the accuracy of the reflecting mirror surface 1a to a desired value by adjusting the number of ribs 3. The increase in the number of ribs 3 does not greatly affect the function of storing and expanding the ribs 3, and the increase in the weight of the entire expandable antenna 1 can be suppressed within the range of increment in the weight of the increased ribs 3.

[Configuration of Ribs]

Figure 2:
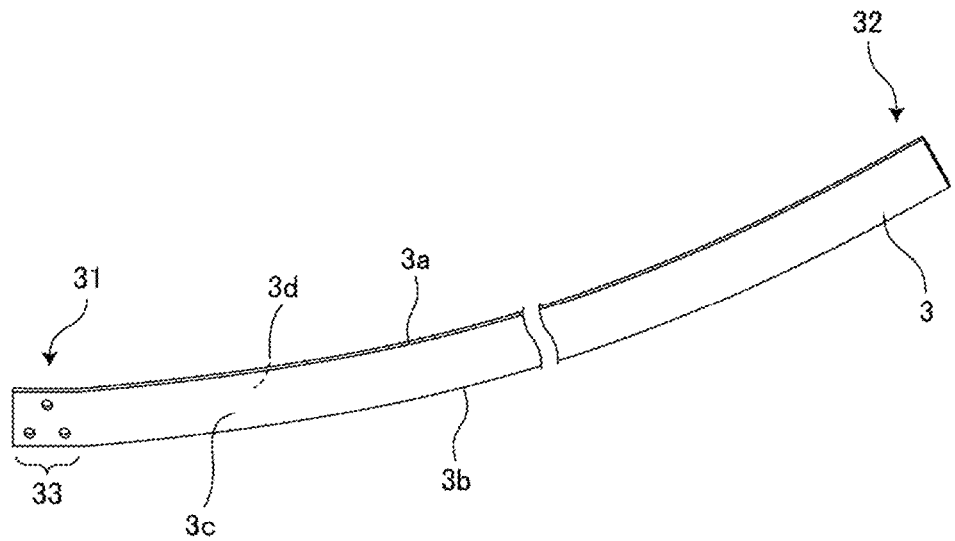
FIG. 2 is a diagram illustrating a configuration example of a rib according to an embodiment of the present invention.

FIG. 2 is a diagram illustrating a configuration example of a rib according to an embodiment of the present invention. FIG. 2 is a perspective view of the rib 3 illustrated in FIG. 1.

The rib 3 illustrated in FIG. 2 has a segment 3a, a segment 3b, a flat plane 3c, and a flat plane 3d, and is a horizontally elongated thin flat plate in which the segment 3a is formed in a parabolic shape from an end portion 31 toward a tip portion 32. As described above, the rib 3 is made of, for example, stainless spring steel or a composite material. Attachment holes 33 (three in FIG. 2) penetrating in a thickness direction are formed in the end portion 31 of the rib 3.

It should be noted that, in the rib 3 illustrated in FIG. 2, the segment 3b opposed to the segment 3a is formed in a parabolic shape like the segment 3a, but the shape of the segment 3b is not limited to the parabolic shape and may have any shapes.

The rib 3 described above can be cut out from a flat plate having characteristics that it is flexible in an out-of-plane direction and an in-plane shape is stable. Therefore, according to the present embodiment, it is possible to manufacture the ribs 3 in an easy manner and at a low cost, as compared with the ribs used in the conventional expandable antenna.

[Attachment Structure of Ribs and Hub]

Figure 3:
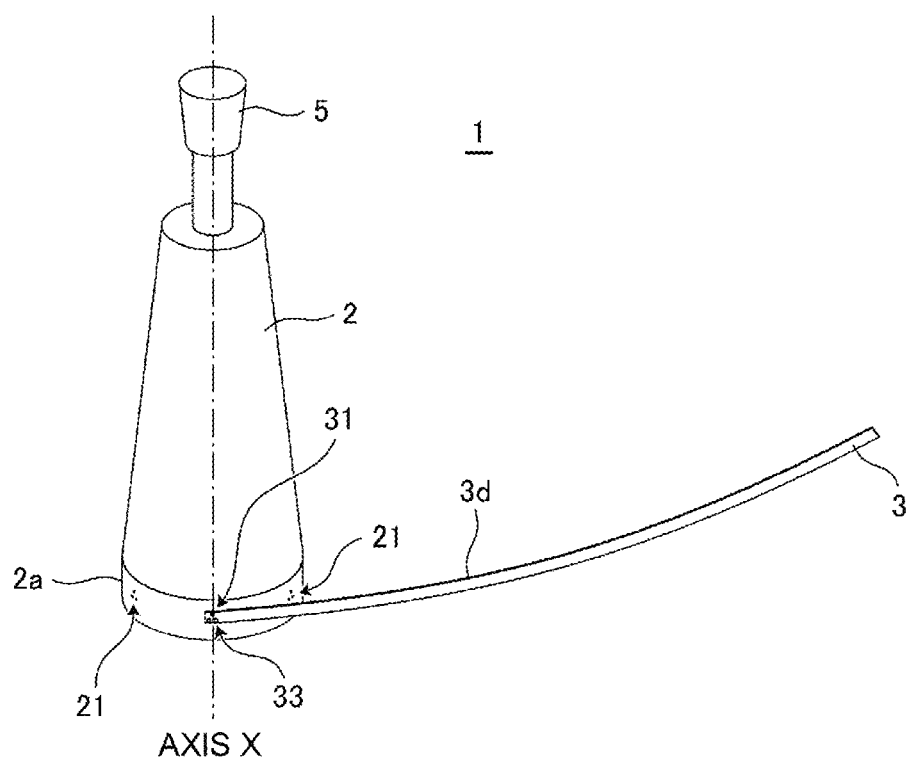
FIG. 3 is a diagram illustrating an example of an attachment structure of a rib and a hub according to an embodiment of the present invention.

FIG. 3 is a diagram illustrating an example of an attachment structure of a rib and a hub according to an embodiment of the present invention. For convenience of explanation, the attachment structure between one rib 3 of the plurality of ribs 3 and the outer circumferential portion 2a of the hub 2 is illustrated in FIG. 3, but the other ribs 3 are also attached to the outer circumferential portion 2a with the same attachment structure.

A plurality of bolt holes 21 (three bolt holes 21 in FIG. 3) are formed with a regular angular pitch in the outer circumferential portion 2a of the hub 2. The hole position of the bolt hole 21 corresponds to the hole position of the attachment hole 33 of the end portion 31 of the rib 3. The rib 3 and the outer circumferential portion 2a of the hub 2 are fixed from the outer side of the rib 3 by a bolt (not illustrated) or the like. Therefore, the flat plane 3d on the end portion 31 side of the rib 3 is fixed so as to be in contact with the rib attachment portion 2a in the circumferential direction. Thus, the flat planes 3c and 3d of the rib 3 are arranged substantially parallel to the antenna axis X.

Figure 4:
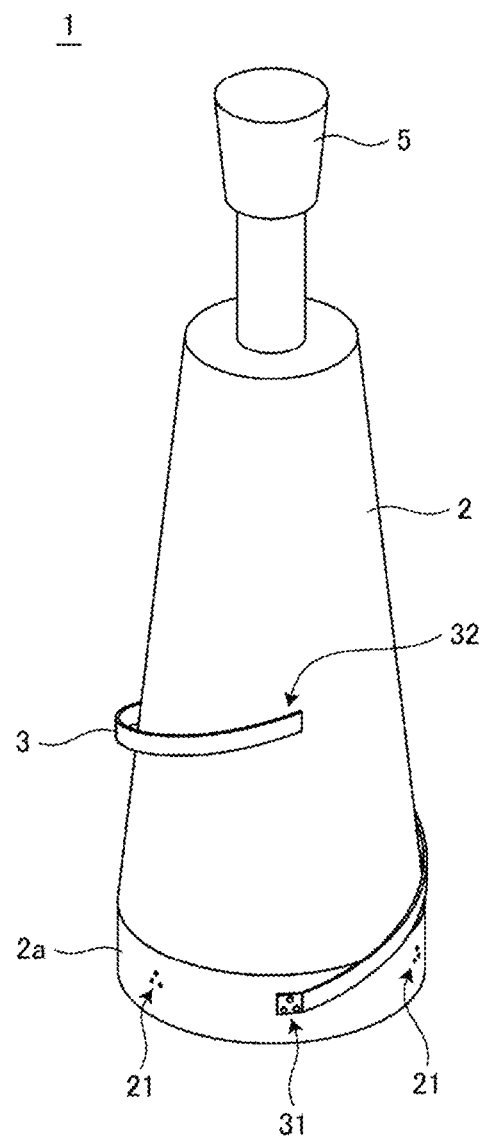
FIG. 4 is a diagram for explaining a rib winding structure according to an embodiment of the present invention.

FIG. 4 is a diagram for explaining a rib winding structure according to an embodiment of the present invention. FIG. 4 illustrates a structure in which the rib 3 illustrated in FIG. 3 is wound around the hub 2.

When the expandable antenna 1 is stored, external restraint is applied to the rib 3 and the rib 3 is deflected in the out-of-plane direction. The rib 3 is wound around the hub 2 from the end portion 31 toward the tip portion 32 as illustrated in FIG. 4.

Here, in the wrap-rib type expandable antenna, the ribs are arranged in a direction perpendicular to the outer circumferential portion 2a of the hub 2, that is, in a radial direction. Therefore, when the rib is wound around the hub 2, the deformation of the end portion of the rib (corresponding to the end portion 31 in FIG. 4) becomes large, which may exceed the yield stress of the rib. There is also a method of arranging a hinge between the end portion of the rib and the hub so as to prevent the generation of a large stress during winding. However, in this method, the structure is complicated by the amount of hinge arrangement, and an additional mechanism is required to ensure that the rib correctly faces the radial direction after the antenna expansion.

On the other hand, according to the expandable antenna 1 of the present embodiment, the rib 3 is fixed so as to be in contact with the outer circumferential portion 2a of the hub 2 in the circumferential direction. Therefore, no large stress is generated and the hinge need not be arranged. In addition, at the time of the antenna expansion, the rib 3 according to the present embodiment extends in a tangential direction in a state of being in contact with the outer circumferential portion 2a of the hub 2, but the segment shape thereof is a parabolic shape as well. Due to this feature, it is easy to accurately calculate the shape of the rib 3 by calculation.

[Storage and Expansion of Ribs]

Figure 5:
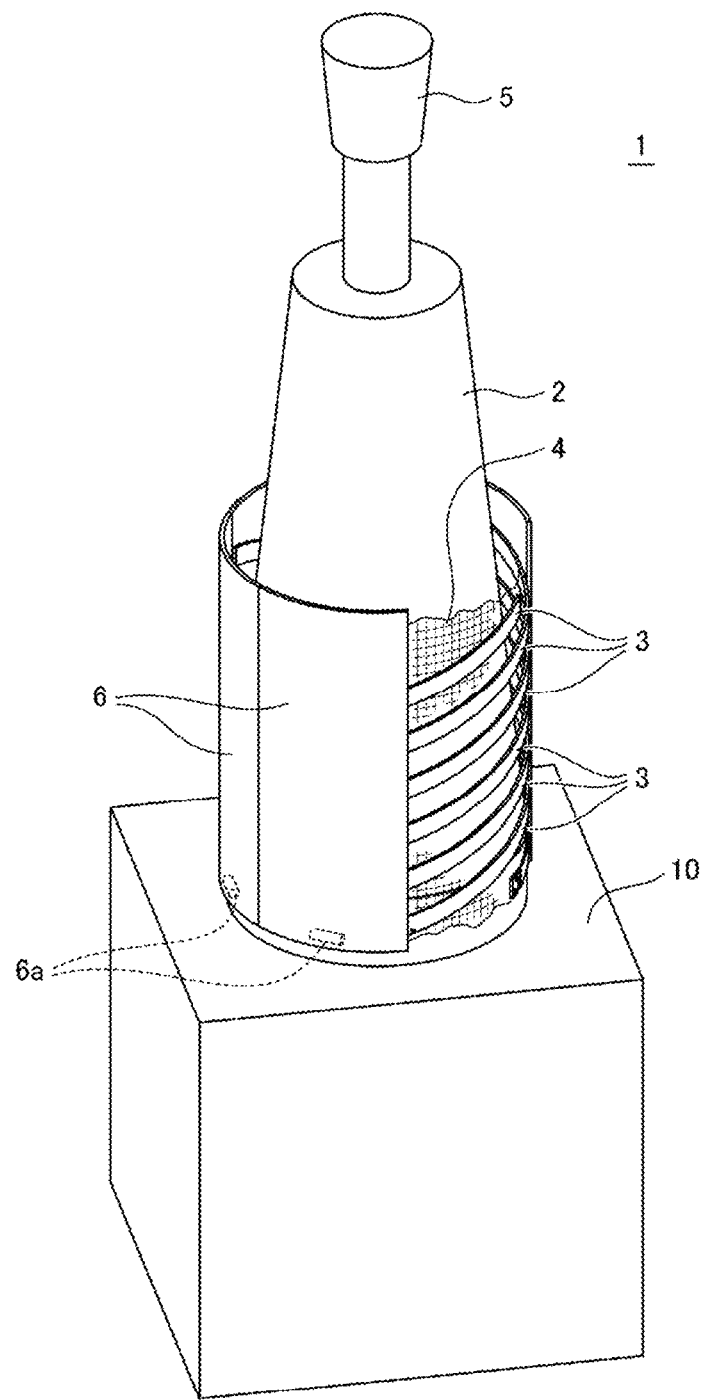
FIG. 5 is a first diagram for explaining storage and expansion of ribs according to an embodiment of the present invention.
Figure 6:
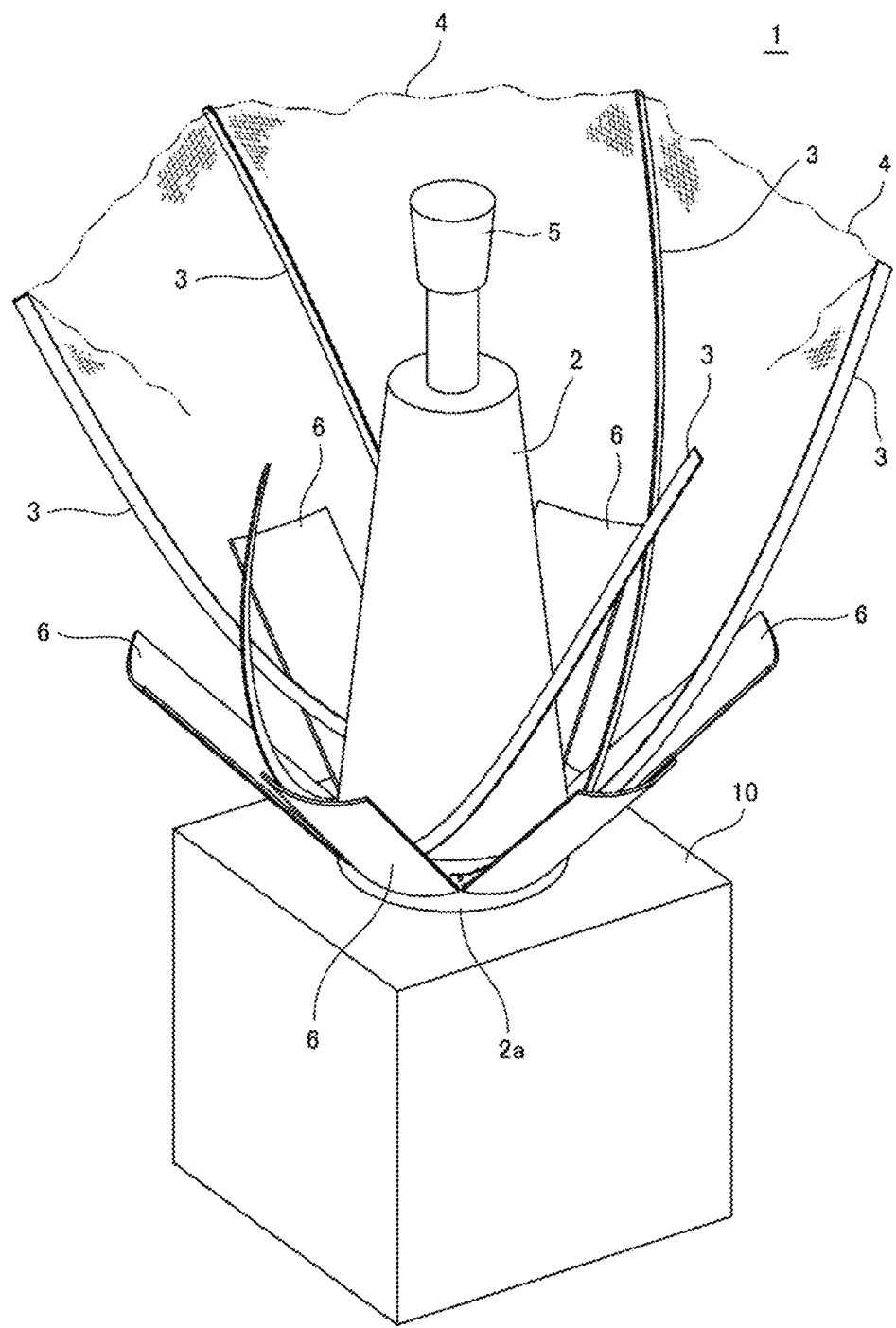
FIG. 6 is a second diagram for explaining storage and expansion of ribs according to an embodiment of the present invention.

FIG. 5 is a first diagram for explaining storage and expansion of ribs according to an embodiment of the present invention. FIG. 6 is a second diagram for explaining storage and expansion of ribs according to an embodiment of the present invention.

In FIG. 5, all of a plurality of ribs 3 are wound around the hub 2, and a plurality of case members 6 are arranged around the ribs 3 so as to surround the wound ribs 3 from the outside. Each of the case members 6 is formed in a tile shape of which a horizontal cross-section is an arc, and the plurality of case members 6 are arranged so as to form a cylindrical shape as a whole. That is, at the time of storage, each of the plurality of ribs 3 is deflected in the out-of-plane direction. After the ribs 3 are wound around the hub 2 from the end portion 31 toward the tip portion 32, external restraint is applied by a predetermined means (the plurality of case members 6 in this case). Therefore, it is possible to reduce the envelope area of the stored shape of the expandable antenna 1.

In FIG. 6, all of the plurality of case members 6 are opened (expanded) so as to be separated from the hub 2 around the lower edges thereof. The opening is mechanically performed by an opening mechanism 6a (see FIG. 5) provided below each of the case members 6. The opening mechanism 6a is a mechanism for expanding the case member 6 by a motor via a worm gear, for example.

When each of the case members 6 is opened (expanded), external restraint by the plurality of case members 6 with respect to each of the plurality of ribs 3 is released. Due to the elastic restoring force of the ribs 3 themselves, the ribs 3 are rewound and start to expand automatically. When the rewinding due to the elastic restoring force of each of the ribs 3 is completed, the parabolic shape of the expandable antenna 1 as illustrated in FIG. 1 is formed. That is, at the time of expansion, external restraint is released by a predetermined means (herein, the plurality of case members 6) for each of the plurality of ribs 3, and the ribs 3 are rewound by the elastic restoring force of each of the plurality of ribs themselves and automatically expanded.

It should be noted that, at the time of expansion, it is assumed that the ribs 3 are expanded with an error to some extent with respect to the out-of-plane direction. However, the in-plane shape of the rib 3 accurately shows the original parabolic shape. The mirror surface accuracy of the expandable antenna 1 is evaluated with an error in the direction of the axis X, that is, a position error in the in-plane direction of the rib 3, and the position error in the out-of-plane direction of the rib 3 does not have a large influence. Therefore, the mirror surface accuracy of the antenna 1 by expansion can be secured.

As described above with reference to FIGS. 5 and 6, according to the expandable antenna 1 according to the present embodiment, the storage and expansion of each of the plurality of ribs 3 is realized by the elastic deformation and restoring force of each of the ribs 3. That is, a special mechanism for storing and expanding the ribs 3 is unnecessary. Therefore, according to the present embodiment, it is possible to easily expand in outer space with a simple structure and realize a desired parabolic shape after expansion.

[First Modification of Ribs]

Figure 7A:
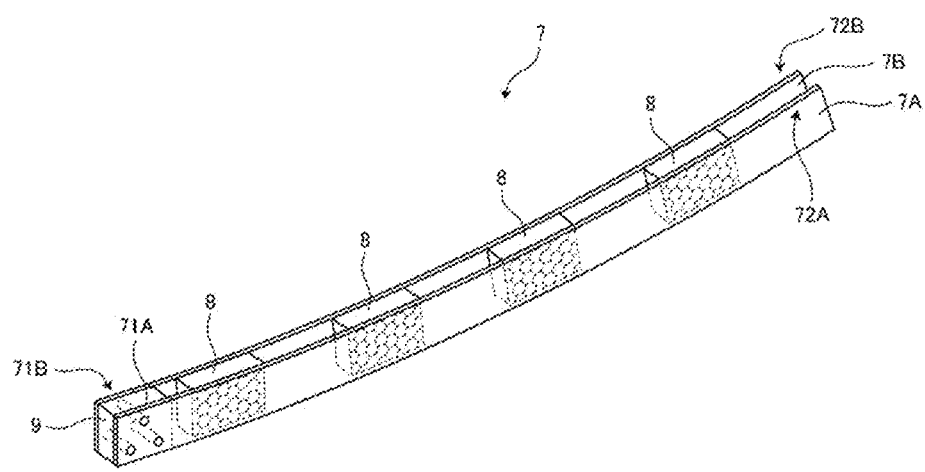
FIG. 7A is a diagram illustrating a first modification of the rib according to the embodiment of the present invention.
Figure 7B:
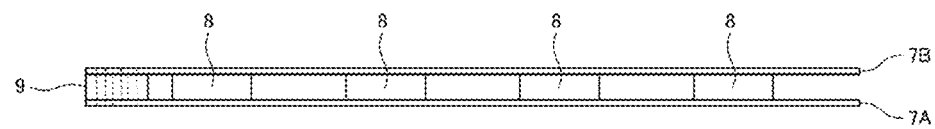
FIG. 7B is a diagram illustrating a first modification of the rib according to the embodiment of the present invention.

FIGS. 7A and 7B are diagrams illustrating a first modification of the rib according to the embodiment of the present invention. FIG. 7A is a perspective view of a rib 7 according to a first modification, and FIG. 7B is a diagram of the rib 7 illustrated in FIG. 7A when viewed from the above.

The above-described rib 3 (see FIG. 2) is the horizontally elongated thin flat plate in which the segment 3a is formed in a parabolic shape from the end portion 31 to the tip portion 32. On the other hand, the rib 7 according to the first modification illustrated in FIGS. 7A and 7B has two horizontally elongated thin flat plates 7A and 7B (hereinafter simply referred to as "flat plates 7A and 7B") and a plurality of spacers 8 fixed in a manner to be sandwiched between the two flat plates 7A and 7B.

As in the above-described rib 3, the flat plate 7A (7B) is a horizontally elongated thin flat plate in which a segment is formed in a parabolic shape from the end portion 71A (71B) toward the tip portion 72A (72B), and is made of, for example, stainless spring steel or a composite material. The plurality of spacers 8 form a honeycomb structure having high strength and high rigidity and are provided at equal intervals apart from each other by a predetermined distance.

When the rib 7 is constituted by the two flat plates 7A and 7B and the plurality of spacers 8 as described above, the rigidity of the rib 7 can be increased. Thus, even when the elastic restoring force is insufficient in the above-described rib 3, sufficient elastic restoring force can be realized. In addition, the rib 7 according to the first modification does not need the molding of the rib and has an advantage that it is easy to manufacture the rib by merely fixing the spacer 8 between the two flat plates 7A and 7B by adhesion or welding.

It should be noted that, in the end portion 71A (71B), a substantially rectangular parallelepiped spacer 9 which is not a honeycomb structure is sandwiched and fixed between the two flat plates 7A and 7B. It should be noted that attachment holes corresponding to the attachment holes 33 in FIG. 2 are formed in both the spacers 9 and the flat plates 7A and 7B.

[Second Modification of Ribs]

Figure 8A:
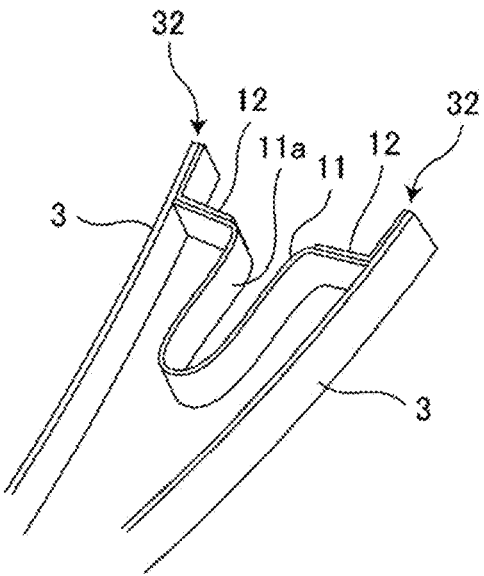
FIG. 8A is a diagram illustrating a second modification of the rib according to the embodiment of the present invention.
Figure 8B:
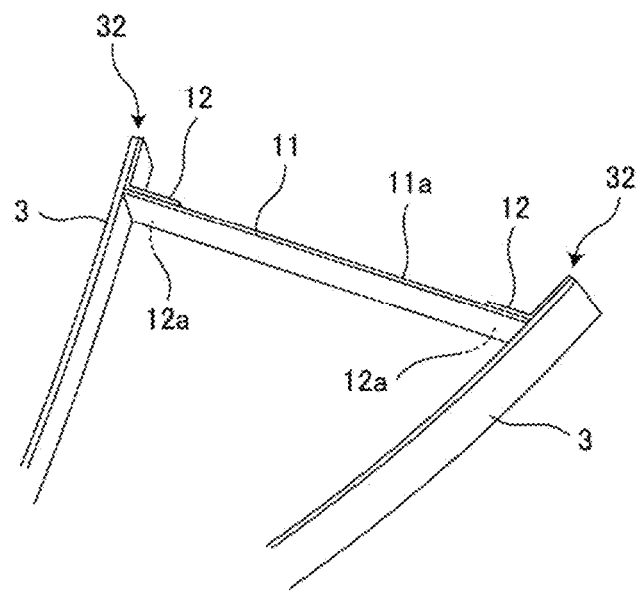
FIG. 8B is a diagram illustrating a second modification of the rib according to the embodiment of the present invention.

FIGS. 8A and 8B are diagrams illustrating a second modification of the rib according to the embodiment of the present invention.

The above-described rib 3 (see FIG. 2) is a horizontally elongated thin flat plate, and the end edges 4a and 4b of the metal mesh 4 are attached to the segment 3a of the adjacent rib 3 (see FIG. 1). However, since the metal mesh 4 has in-plane tension at the time of antenna expansion, there is a possibility that the interval between the adjacent ribs 3 becomes smaller than the original intervals according to the influence of the tension of the metal mesh 4, thereby resulting in a half-opened state. In order to prevent such a situation, it is general that the out-of-plane rigidity of the rib 3 is increased.

On the other hand, in the rib 3 according to the second modification, as illustrated in FIGS. 8A and 8B, the distance between the adjacent ribs 3 at the time of antenna expansion is forcibly set to a predetermined value by providing reinforcing ribs 11 between the adjacent ribs 3.

In the rib 3 according to the second modification, L-shaped flanges 12 are fixed in the respective planes of the tip portions 32 of the adjacent ribs 3 so as to face each other.

The reinforcing ribs 11 are interposed between the tip portions 32 of the adjacent ribs 3. That is, the flat planes 11*a* on both longitudinal end sides of the reinforcing rib 11 are fixed to a back surface 12*a* of the L-shaped flange 12. The reinforcing rib 11 is a horizontally elongated thin plate made of a elastic material. It should be noted that the reinforcing rib 11 may be one convex tape curved in the width direction, or may be one in which two convex tapes are superimposed in the longitudinal direction in a manner to be curved outward.

At the time of storage, as illustrated in FIG. 8A, the auxiliary rib 11 is deflected in the out-of-plane direction and accommodated in a state in which the distance between the tips of the adjacent ribs 3 is short. On the other hand, at the time of expansion, as illustrated in FIG. 8B, the distance between the ribs 3 is forcibly set to a predetermined value by the elastic restoring force of the auxiliary ribs 11. Therefore, it is possible to prevent the half-opened state due to the influence of the tension of the metal mesh 4.

As explained above, the expandable antenna 1 according to the present embodiment is the expandable antenna 1 including the plurality of ribs 3 arranged with a regular angular pitch in the outer circumferential portion 2*a* of the hub 2, and the metal meshes 4 installed between the plurality of adjacent ribs 3. Each of the plurality of ribs 3 is formed in a horizontally elongated thin flat plate with elasticity, and the segment 3*a* to which the metal mesh 4 is attached is formed in a parabolic shape. The flat planes 3*c* and 3*d* of each of the plurality of ribs 3 are arranged so as to be substantially parallel to the central axis X of the hub 2. Therefore, it is possible to easily expand in outer space with a simple structure and realize a desired shape (especially, a parabolic shape) after expansion.

Although the embodiment of the present invention has been described above, the above-described embodiment shows one application example of the present invention, and the technical scope of the present invention is not limited to the specific configuration of the above-described embodiment.

For example, in the above description, the case in which the metal mesh 4 is a reticulated body made of a metal such as molybdenum or gold has been described as an example, but the present invention is not limited to this case. For example, the metal mesh 4 may be a structure having a cable network structure.

In addition, for example, in the above description, the case in which the outer circumferential portion 2*a* of the hub 2 is circular has been described as an example, but the present invention is not limited to this case. For example, the outer circumferential portion of the hub may have a polygonal shape.

In addition, in the above description, the case in which the expandable antenna 1 is a parabolic antenna without a sub-reflecting mirror has been described as an example, but the present invention is not limited to this case. For example, the expandable antenna may be a Cassegrain type antenna in which a primary radiator 5 (see FIG. 1) emits radio waves to a sub-reflecting mirror, and radio waves reflected by the sub-reflecting mirror are incident on a reflecting mirror surface 1*a* which is a main reflecting mirror.

REFERENCE SIGNS LIST

1 Expandable antenna
2 Hub
2*a* Outer circumferential portion (rib attachment portion)
3, 7 Rib
3*a*, 3*b* Segment
3*c*, 3*d* Flat plane
4 Metal mesh
7A, 7B Horizontally elongated thin flat plate
8 Spacer
11 Reinforcing rib
31 End portion
32 Tip portion
X Axis

The invention claimed is:

1. An expandable antenna comprising: a plurality of ribs arranged with a regulated angular pitch at an outer circumferential portion of a hub, the hub being fixed to a satellite structure; and a metal mesh installed between the plurality of adjacent ribs, wherein each of the plurality of ribs is formed in a horizontally elongated thin flat plate shape with elasticity, and a segment to which the metal mesh is attached is formed in a parabolic shape, wherein a flat plane of each of the plurality of ribs is arranged so as to be substantially parallel to a central axis of the hub, wherein said expandable antenna is configured to expand to form a parabolic shape, the parabolic shape being realized with an elastic force of the plurality of ribs toward an expansion direction and an in-plane tension that the metal mesh has at a time of expansion, wherein, at a time of storage, each of the plurality of ribs is wound around the hub from an end portion to a tip portion and is externally restrained by a predetermined means, the predetermined means being arranged on the satellite structure, wherein, at the time of expansion, each of the plurality of ribs is rewound and expanded by elasticity of each of the plurality of ribs by releasing the external restraint by the predetermined means, wherein said predetermined means is configured to move from a first position to a second position wherein said predetermined means at the first position sandwiches the plurality of ribs between said predetermined means and the outer circumferential portion of the hub to restrain the plurality of ribs, wherein said predetermined means at the second position is away from the outer circumferential position to release the plurality of ribs, and wherein the hub at which the plurality of ribs are arranged is fixed to the satellite structure so that the hub is not movable with respect to the satellite structure, while said predetermined means moving from the first position to the second position and moving from the second position to the first position.

2. The expandable antenna according to claim 1, wherein a flat plane of an end portion of each of the plurality of ribs is fixed so as to be in contact with the outer circumferential portion of the hub in a circumferential direction.

3. The expandable antenna according to claim 1, wherein each of the plurality of ribs is constituted by two horizontally elongated thin flat plates and a spacer fixed between the two horizontally elongated thin flat plates.

4. The expandable antenna according to claim 1, further comprising a reinforcing rib interposed between tip portions of the plurality of adjacent ribs.

* * * * *